(12) United States Patent
Hickey (10) Patent No.: US 8,303,849 B2
(45) Date of Patent: Nov. 6, 2012

(54) HCN REMOVAL FROM SYNGAS USING CHEMICAL AND BIOLOGICAL TREATMENT

(75) Inventor: Robert Hickey, Okemos, MI (US)

(73) Assignee: Coskata, Inc., Warrenville, IL (US)

( * ) Notice: Subject to any disclaimer, the term of this patent is extended or adjusted under 35 U.S.C. 154(b) by 72 days.

(21) Appl. No.: 12/942,833

(22) Filed: Nov. 9, 2010

(65) Prior Publication Data

US 2011/0097701 A1 Apr. 28, 2011

Related U.S. Application Data

(63) Continuation-in-part of application No. 12/606,469, filed on Oct. 27, 2009, now Pat. No. 7,927,513.

(51) Int. Cl.
*C10K 1/08* (2006.01)

(52) U.S. Cl. ............. 252/373; 423/215.5; 423/236; 423/237; 423/238; 423/243.01; 210/601; 210/620

(58) Field of Classification Search ................ 252/373; 423/237, 238, 243.01, 215.5, 236; 210/601, 210/620
See application file for complete search history.

(56) References Cited

U.S. PATENT DOCUMENTS

| | | | |
|---|---|---|---|
| 4,189,307 A * | 2/1980 | Marion | 48/197 R |
| 4,328,075 A | 5/1982 | Fitzgibbons et al. | |
| 5,173,429 A | 12/1992 | Gaddy et al. | |
| 5,200,161 A | 4/1993 | Fischer et al. | |
| 5,221,440 A | 6/1993 | Miyagi et al. | |
| 6,136,577 A | 10/2000 | Gaddy | |
| 6,340,581 B1 | 1/2002 | Gaddy | |
| 7,285,402 B2 | 10/2007 | Gaddy et al. | |
| 7,704,723 B2 | 4/2010 | Huhnke et al. | |
| 7,927,513 B1 * | 4/2011 | Hickey | 252/373 |
| 2007/0275447 A1 | 11/2007 | Lewis et al. | |
| 2008/0305540 A1 | 12/2008 | Hickey et al. | |
| 2009/0215139 A1 | 8/2009 | Datta et al. | |
| 2009/0215163 A1 | 8/2009 | Tsai et al. | |

FOREIGN PATENT DOCUMENTS

WO WO2008154301 12/2008

OTHER PUBLICATIONS

Clausen, E.C., et al., "Ethanol From Biomass by Gasification/Fermentation", Presented at Plastics, Tires, Auto Wastes/Biomass MSW Symposium, Fall 1993, Chicago, 38 (3).

(Continued)

*Primary Examiner* — Timothy Vanoy (57) ABSTRACT

A method of HCN removal from syngas including treating a hot syngas stream for conversion to chemical products by removing various components from the hot syngas stream by: passing the hot syngas stream to a scrubber; adding aldehyde to a circulating scrubber water; capturing ammonia and HCN in the circulating scrubber water and condensing water from the hot syngas stream into the circulating scrubber water; withdrawing a scrubber waste water effluent from the scrubber comprising absorbed ammonia, ammonium, and absorbed HCN, and glycol nitriles, formed from the reaction of the aldehydes with HCN, from the scrubber; withdrawing a treated syngas stream effluent from the scrubber having a reduced concentration of ammonia and HCN; and, passing at least a portion of the scrubber waste water effluent stream to a biological treatment zone for the removal of ammonia, absorbed HCN, and glycol nitriles.

20 Claims, 3 Drawing Sheets

OTHER PUBLICATIONS

Klasson, K.T., et al., "Biological Production of Liquid and Gaseous Fuels from Synthesis Gas," Appl. Biochem. Biotechnol., vol. 24-25, No. 1, Mar. 1990, 857-873.

Vega, J. L., et al., "The Biological Production of Ethanol from Synthesis Gas," Appl. Biochem. Biotechnol. vol. 20-21, No. 1, Jan. 1989, 781-797.

Phillips, John R., et al., "Synthesis Gas as Substrate for the Biological Production of Fuels and Chemicals," Appl. Biochem. Biotechnol. vol. 45-46, No. 1, Mar. 1994, 145-157.

Barik, S., et al., "Biological Production of Alcohols from Coal Through Indirect Liquefaction," Appl. Biochem. Biotechnol. vol. 18, No. 1, Aug. 1988, 363-387.

Das, A. and L.G. Ljungdahl, Electron Transport System in Acetogens, Chapter 14, Biochemistry and Physiology of Anaerobic Bacteria, L.G. Ljungdahl eds,. Springer (2003).

Drake, H.L. and K. Kusel, Diverse Physiologic Potential of Acetogens, Chapter 13, Biochemistry and Physiology of Anaerobic Bacteria, L.G. Ljungdahl eds,. Springer (2003).

Andrew J. Grethlein, R. Mark Worden, Mahendra K. Jain, and Rathin Datta; Evidence for Production of n-Butanol from Carbon Monoxide by Butyribacterium methylotrophicum, Journal of Fermentation and Bioengineering, vol. 72, 1991, p. 58-60.

R. M. Worden, A. J. Grethlein, M. K. Jain, and R. Datta; Production of butanol and ethanol from synthesis gas via fermentation, Fuel, vol. 70, May 1991, p. 615-619.

* cited by examiner

HCN REMOVAL FROM SYNGAS USING CHEMICAL AND BIOLOGICAL TREATMENT

CROSS-REFERENCE TO RELATED APPLICATIONS

This application is a Continuation-In-Part application that claims the benefit of U.S. Non-Provisional patent application Ser. No. 12/606,469 filed Oct. 27, 2009, now U.S. Patent No. 7,927,513, which is incorporated in its entirety herein by this reference.

FIELD OF THE INVENTION

This invention relates to methods for removing ammonia, and HCN from syngas, in an environmentally benign and sustainable fashion using a combination of water based gas scrubbing and biological processing steps.

DETAILED DESCRIPTION

Background

Biofuels production for use as liquid motor fuels or for blending with conventional gasoline or diesel motor fuels is increasing worldwide. Such biofuels include, for example, ethanol, propanol and n-butanol. One of the major drivers for biofuels is their derivation from renewable resources by fermentation and bioprocess technology. Conventionally, biofuels are made from readily fermentable carbohydrates such as sugars and starches. For example, the two primary agricultural crops that are used for conventional bioethanol production are sugarcane (Brazil and other tropical countries) and corn or maize (U.S. and other temperate countries). The availability of agricultural feedstocks that provide readily fermentable carbohydrates is limited because of competition with food and feed production, arable land usage, water availability, and other factors. Consequently, lignocellulosic feedstocks such as forest residues, trees from plantations, straws, grasses and other agricultural residues may become viable feedstocks for biofuel production. However, the very heterogeneous nature of lignocellulosic materials that enables them to provide the mechanical support structure of the plants and trees makes them inherently recalcitrant to bioconversion.

One available technology path to convert lignocellulosic biomass to ethanol is to convert lignocellulosic biomass to syngas (also known as synthesis gas, primarily a mix of CO, $H_2$ and $CO_2$ with other components such as $CH_4$, $N_2$, $NH_3$, $H_2S$ and other trace gases) in a gasifier and then ferment this gas with anaerobic microorganisms to produce biofuels such as ethanol, propanol, and n-butanol or chemicals such as acetic acid, butyric acid and the like. This technology path can convert all of the components to syngas with good efficiency (e.g., greater than 75%), and some strains of anaerobic microorganisms can convert syngas to ethanol, propanol, n-butanol or other chemicals with high (e.g., greater than 90% of theoretical) efficiency. Moreover, syngas can be made from many other carbonaceous feedstocks such as natural gas, reformed gas, peat, petroleum coke, coal, solid waste and land fill gas, making this a more universal technology path.

However, production of syngas from biomass results in the generation of carbonyl sulfide (COS) and nitrogenous compounds including ammonia and hydrogen cyanide (HCN) as contaminants that are detrimental to both chemical and biological conversion of the syngas to useful chemicals. These contaminants must be removed from syngas and then managed or destroyed in an environmentally acceptable manner, generally at significant expense.

Conventional methods for removal of ammonia, COS and HCN from syngas prior to its use generally involves scrubbing with aqueous solutions to remove these compounds from the syngas with subsequent discharge of the scrubbing solutions to wastewater treatment or via alternate disposal methods. Modern processes for ammonia removal include the water wash process in which the gas is scrubbed by water, which dissolves the ammonia. The resulting scrubbing solution is pumped to an ammonia still where steam is used to strip out the ammonia. The ammonia vapors from the still can be processed to form ammonium sulfate, condensed to form a strong ammonia solution, incinerated or catalytically converted to nitrogen and hydrogen which are then recycled back into the gasifier.

Another process for ammonia removal from coke oven gas is the PHOSAM process developed by US Steel. This process absorbs the ammonia from the gas stream using a solution of monoammonium phosphate. The process produces saleable anhydrous ammonia, but operates at temperatures on the order of 50 degrees Celsius and pressures up to 190 psig (~13 atmospheres of pressure gauge) in the stripper column.

There is a need for a more robust and cost effective method for the treatment of syngas, particularly when used for biological transformation to useful liquid products such as ethanol, propanol, butanol, or acetic acid.

Well known and available biological treatment processes used in concert with water based scrubbers can meet the objectives of high removal of ammonia and HCN from syngas. Biological treatment processes can operate at atmospheric pressure and low temperatures without the excessive cost of expensive chemicals and operate without the generation of hazardous and/or toxic wastes. Biological treatment processing of ammonium and HCN absorbed into water from gas streams has been done before. Ammonia is, in general, removed using a slightly acidic or neutral pH scrubbing solution and this spent solution is sent to an aerobic wastewater treatment system where the ammonia is oxidized to nitrate and the nitrate subsequently reduced to nitrogen gas via denitrification, generally using an added organic electron donor such as methanol.

SUMMARY OF THE INVENTION

In the instant invention, the objectives of high removal of ammonia, COS and HCN from syngas and their subsequent destruction in a cost effective, environmentally sustainable fashion is achieved by taking advantage of the fact that, during biological fermentation of syngas to ethanol and/or other soluble products, some water must be purged from the system to assist in the wasting of excess cellular biomass, as well as to prevent the buildup of secondary metabolites and dissolved solids. For the case of converting syngas to ethanol, acetic acid/acetate is present in the purged water. The acetic acid/acetate provides control of the pH in the scrubber (if there is insufficient $CO_2$ in the syngas to accomplish this) used to capture ammonia and COS and the acetate can then be used as the electron donor for the conversion of nitrate formed via biological oxidation of the absorbed ammonia to $N_2$ gas.

Thus, the instant invention involves a multi-step process in which a biological treatment zone is used in concert with water based scrubbers and can include additional scrubbing towers for high removal efficiency of ammonia and HCN from syngas and their subsequent destruction in a cost effective, environmentally sustainable fashion.

In the instant invention, after a preliminary step for removal of particulates in the syngas via a separator, bag house/filter, or similar device, the ammonia gas in the syngas stream is captured in a scrubber solution. This operation concurrently cools the syngas and results in considerable condensation of water vapor from the syngas into the scrubbing solution. The scrubbing solution added to the scrubber can be recycled condensate and/or the purge water from a fermentation process and/or still bottoms that are acidic due to the presence of an acid, acetic acid in the case of ethanol production, in the water. This is sufficient to keep the pH in the scrubber low enough so that a high efficiency for ammonia removal can be achieved. Under these conditions scrubbing efficiency for HCN is relatively poor due to the relatively low solubility of the HCN under acid conditions. The temperature, pressure, and HCN concentration in the syngas will all affect removal of HCN that can be achieved.

The ammonia rich scrubber solution is then sent to a two stage anoxic-aerobic biological treatment zone. It should be noted that depending upon the device(s) used to remove particulates in the syngas stream, removal may not be complete. In these cases the particulates will be removed in the scrubber along with the ammonia. The particulates captured can be removed from the purged scrubber solution before the flow is sent to biological treatment and the solids managed separately or both captured particulates and ammonia can be sent to treatment directly. The choice will depend on the relative amount of particulates captured.

While the effluent from the scrubber can be processed in the anoxic-aerobic biological treatment zone, the effluent from the biological treatment zone may be internally recycled and processed back into the anoxic-aerobic treatment zone.

At least partial degradation of the HCN in the scrubber solution is achieved in the anoxic step which reduces any inhibition or toxicity that this compound can cause on nitrification (biological ammonium oxidation). Alkalinity produced via the absorption and dissociation of the ammonia to ammonium in the scrubber water combined with the additional alkalinity produced during reduction of the nitrate to $N_2$ gas, using the acetate/acetic acid in the anoxic biological treatment step provides sufficient alkalinity after the anoxic biological treatment step to buffer the water during the ammonium oxidation or nitrification step with little to no requirement for an external source of alkalinity (such as caustic). Thus the process arrangement comprises a biological treatment processor used in concert with a water based scrubber(s) for the high removal of ammonia and HCN from syngas. The purge flow from the fermentation process supplies acetic acid to the scrubber. This helps maintain the appropriate pH range in the scrubber water while eliminating the need for adding acid to achieve this, thus saving on cost.

At least a portion of the scrubber water effluent is sent to the first step in the biological treatment zone, the anoxic biological treatment step, for the partial conversion of nitrate formed from ammonia, and ammonium into nitrogen gas.

Additionally, at least a portion of the treated syngas stream effluent from the scrubber which contains HCN may pass to an additional scrubbing tower for contact with another scrubbing water stream for additional HCN removal. In which case a scrubbing tower water effluent is withdrawn from the scrubbing tower and at least a portion of the HCN scrubbing water effluent is blended with the scrubber waste water effluent in the anoxic biological treatment step.

Besides water scrubbing, HCN can also be removed chemically such as by the addition of aldehyde, such as formaldehyde, to the scrubber water. Aldehyde added to the scrubber water can react with or otherwise sequester HCN allowing for high HCN capture efficiency in the scrubber. The HCN and product(s), which are formed from the reaction of the added aldehyde with HCN, are then removed in the downstream anoxic-aerobic biological processing steps. In some embodiments, the addition of aldehyde to the scrubber water to capture HCN allows for the elimination of a separate scrubbing tower to remove residual HCN in the syngas.

In embodiments where no aldehydes are released into the cleaned syngas it is possible to operate the scrubber as a counter current multistage scrubber where the aldehyde is added to the first stage and the additional stage(s) ensure the aldehyde is removed from the syngas prior to at least a portion of the syngas being sent to the fermentation step. Alternatively, an additional stage can be a separate polishing scrubber that captures any aldehydes as well as removes residual HCN in the syngas stream.

The acetate/acetic acid added via the purge water to the scrubber waste water effluent is used as both the electron donor to reduce the nitrate to $N_2$ gas and as the source of carbon for cellular growth of microorganisms. This eliminates the need and cost of adding an external source for an electron donor and carbon source. The removed or otherwise captured HCN is at least partially degraded in the anoxic biological treatment step. The HCN is converted to compounds that are benign to microorganisms in the second step of the biological treatment zone, the aerobic biological treatment step. At least a portion of the anoxic effluent stream passes to the aerobic biological treatment step for the nitrification of ammonium to nitrates. Afterwards, the biologically treated waste water stream is withdrawn from the aerobic biological treatment step. A portion of the biologically treated waste water stream is internally recycled back into the anoxic biological treatment step and, when a separate scrubbing tower is provided to remove residual HCN, another portion of the biologically treated waste water stream could be recycled into the scrubbing tower as at least a portion of a scrubbing water stream for contact with the HCN. In some embodiments, the biologically treated waste water contains nitrate that is removed from the stream as it is recycled through additional scrubbing towers and back into the anoxic biological treatment step in the process. The amount of biologically treated waste water internally recycled from the aerobic biological treatment step to the anoxic biological treatment step is adjusted to maintain a predetermined effluent nitrate concentration.

The reaction of nitrate reduction to $N_2$ gas in the anoxic biological treatment step produces approximately 3.57 mg alkalinity per mg of nitrate-N reduced. This is the same as is produced by the absorption and dissociation of ammonia into water as ammonium (3.57 mg alkalinity per mg. $NH_3$—N absorbed). When the anoxic effluent stream passes on to the aerobic biological treatment step this alkalinity along with the alkalinity from ammonia absorption maintains the pH in the range needed for the subsequent oxidation of the ammonium to nitrate which consumes approximately 7.14 mg alkalinity per mg of $NH_4$—N oxidized to $NO_3$—N. Oxidation of any residual organics from the anoxic biological treatment step also occurs in the aerobic biological treatment step.

By controlling the flow of the biologically treated waste water that is either internally recycled back to the anoxic biological treatment step from the aerobic biological treatment step or routed through additional scrubbing towers, the concentration of nitrate in the final biological treated waste water effluent may be controlled. Additionally, the internal recycle loop of recycling the biologically treated waste water stream directly into the anoxic biological treatment step allows the recycle rate to be decoupled from what is needed for scrubbing HCN and, therefore, better process control of the final biological treated waste water effluent quality is achieved. If extremely stringent nitrate discharge levels have to be met, a small polishing anoxic biological treatment step may be added prior to discharge.

The result is high removal of ammonia, and HCN from the syngas in a cost effective and environmentally benign and sustainable fashion, with the need for little to no chemical addition.

DESCRIPTION OF THE PREFERRED EMBODIMENT(S)

Bioconversions of CO and $H_2/CO_2$ to acetic acid, ethanol and other products are well known. For example, in a recent book concise description of biochemical pathways and energetics of such bioconversions have been summarized by Das, A. and L. G. Ljungdahl, Electron Transport System in Acetogens and by Drake, H. L. and K. Kusel, Diverse Physiologic Potential of Cetogens, appearing respectively as Chapters 14 and 13 of Biochemistry and Physiology of Anaerobic Bacteria, L. G. Ljungdahl eds., Springer (2003). Any suitable microorganisms that have the ability to convert the syngas components: CO, H2, CO2 individually or in combination with each other or with other components that are typically present in syngas may be utilized. Suitable microorganisms and/or growth conditions may include those disclosed in U.S. patent application Ser. No. 11/441,392, filed May 25, 2006, entitled "Indirect or Direct Fermentation of Biomass to Fuel Alcohol," which discloses a biologically pure culture of the microorganism *Clostridium Carboxidivorans* having all of the identifying characteristics of ATCC no. BAA-624; and U.S. patent application Ser. No. 11/514,385 filed Aug. 31, 2006 entitled "Isolation and Characterization of Novel Clostridial Species," which discloses a biologically pure culture of the microorganism *Clostridium Ragsdalei* having all of the identifying characteristics of ATCC No. BAA-622; both of which are incorporated herein by reference in their entirety. *Clostridium Carboxidivorans* may be use, for example, to ferment syngas to ethanol and/or n-butanol. *Clostridium Ragsalei* may be used, for example, to ferment syngas to ethanol.

Suitable microorganisms and growth conditions include the anaerobic bacteria *Butyrubacterium Methylotrphicum*, having the identifying characteristics of ATCC 33266 which can be adapted to CO and used to enable the production of n-butanol as well as butyric acid as taught in the references: "Evidence for Production of n-Butanol from Carbon Monoxide by *Butyribacterium Methylotrophicum*, " Journal of Fermentation and Bioengineering, vol. 72, 1991, p. 58-60; "Production of butanol and ethanol from synthesis gas via fermentation, "FUEL, vol. 70, May 1991, p. 615-619. Other suitable microorganisms include *Clostridium Ljungdahli*, with strains having the identifying characteristics of ATCC 49587 (U.S. Pat. No. 5,173,429) and ATCC 55988 and 55989 (U.S. Pat. No. 6,136,577) and this will enable the production of ethanol as well as acetic acid. All of these references are incorporated herein in their entirety.

This invention can be used with any stream that contains a suitable concentration of syngas components. Suitable streams will preferably contain a minimum of 10 wt. % CO and/or H2. The system will normally operate under anaerobic conditions.

Production of syngas from biomass results in the generation of nitrogenous compounds, such as ammonia, and hydrogen cyanide (HCN), as contaminants that are detrimental to both chemical and biological conversion of the syngas to useful chemicals such as ethanol. These contaminants must be removed from syngas and then managed or destroyed in an environmentally acceptable manner. The instant invention involves a multi-step process in which a biological treatment processor is used in concert with water based scrubbers and other optional scrubbing towers for the high removal of ammonia and HCN from syngas and their subsequent destruction in a cost effective, environmentally sustainable fashion.

Well known and used biological treatment processes, used in concert with water based scrubbers can meet the objectives of high level removal of ammonia and HCN from syngas and their subsequent destruction or ancillary use in a cost effective, environmentally sustainable fashion. Such may be achieved by taking advantage of the fact that, during biological fermentation of syngas to ethanol and other soluble products, some water must be purged from the conversion system to assist in the wasting of excess cellular biomass, as well as to prevent the buildup of secondary metabolites and dissolved solids.

For the case of conversion of syngas to ethanol, acetic acid/acetate is present in the purged water. The existence of acetic acid/acetate in the purged water helps control of pH in the scrubber used to capture ammonia, and provides acetate for use as the electron donor for the conversion of nitrate formed via biological oxidation of the absorbed ammonia to $N_2$ gas.

Besides the use of water scrubbing to remove HCN, an alternative environmentally sustainable route includes the removal of HCN directly from the syngas and conversion to a biodegradable compound in the initial scrubbing of the raw syngas, such as in a water-based scrubber. The route is based on well known processes that react or complex acetonitrile and various cyanides into biodegardable compounds through the addition of an aldehyde into the scrubber to form glycol nitriles. Non-limiting examples of aldehydes that can be used include formaldehyde, acetaldehyde, acrolein(prop-2-enal), and so forth. More specifically, both acidic and alkaline circulating scrubber water having formaldehyde can effectively convert both HCN dissolved in the scrubbing water and gas phase into glycolonitrile(2-hydroxyacetonitrile), a biodegradable compound. Such biodegradable compounds in the scrubber effluent solution can be readily degraded in the anoxic-aerobic biological treatment zone with the caution that certain levels of residual cyanides or aldehyde can be biological toxins. Thus, the effectiveness of anoxic-aerobic biological treatment zone can depend on the amount of cyanides or aldehydes in the feed to this zone. Accordingly, the aldehyde addition rate can be use to control these amounts and correspondingly the effectiveness of the anoxic-aerobic biological treatment zone. The use of aldehydes for HCN removal is further explained in U.S. Pat. No. 5,200,161 issued Apr. 6, 1993, and entitled "Process for the separation of hydrogen cyanide from gases and waste gases," and U.S. Pat. No. 4,328,075 issued May 4, 1982, entitled "Removal of cyanides from acetonitrile," both of which are incorporated herein by reference in their entirety.

In some embodiments, the rate or amount of aldehyde supplied to the scrubber can be controlled by the use of at least one sensor that senses an indication of certain chemicals in the cleaned syngas or scrubber liquid. For example, a sensor that monitors the scrubber effluent liquid can be selected to either directly and/or indirectly sense HCN, glycol nitrile, and/or aldehyde either individually or in various combinations. Non-limiting techniques include the measurement of HCN captured in the scrubbing liquid as glycol nitrile as taught in the abovementioned, U.S. Pat. No. 5,200,161. In this instance captured glycol nitrile is oxidized back to HCN which is then measured. While the whole scrubber liquid could be oxidized, the commonly known technique of utilizing a measuring stream, a small stream separated from the scrubbing liquid, is used. The measured indication of HCN concentration is then used to control aldehyde addition. Other techniques can be based on specific sensors and chemical analysis as commonly available in industry. Such sensors and techniques can sense or determine indications of aldehyde, glycol nitrile, and/or the corresponding captured HCN in the scrubber liquid. The indication, such as a measured concentration, can then be used to adjust aldehyde addition rate. In embodiments where essentially all the HCN in the scrubber liquid has been reacted to glycol nitrile such that at least one sensor indicates an excess amount of aldehyde in the water scrubber, the aldehyde addition rate can be adjusted to meet a desired aldehyde level in either subsequent fermentation or biological treatment steps.

In yet other embodiments, sensors can be used to measure an indication of aldehyde and HCN in the cooled syngas before further use in fermentation in a biological reactor for the production of liquid fuels such as ethanol. Examples of such sensors include, but are not limited to, gas chromatograph/mass spectrometer devices. Aldehyde addition rate can be adjusted accordingly based on biological reactor feed stock limitations and requirements. Optionally, when the water scrubber includes an aldehyde scrubber, or polishing step, designed to process at least a portion of the syngas to ensure any aldehydes added to enhance HCN removal and that may be volatilized into the syngas are removed from the syngas before it is sent to its final use, the indication of aldehyde can be used to adjust scrubber operation.

Figure 1:
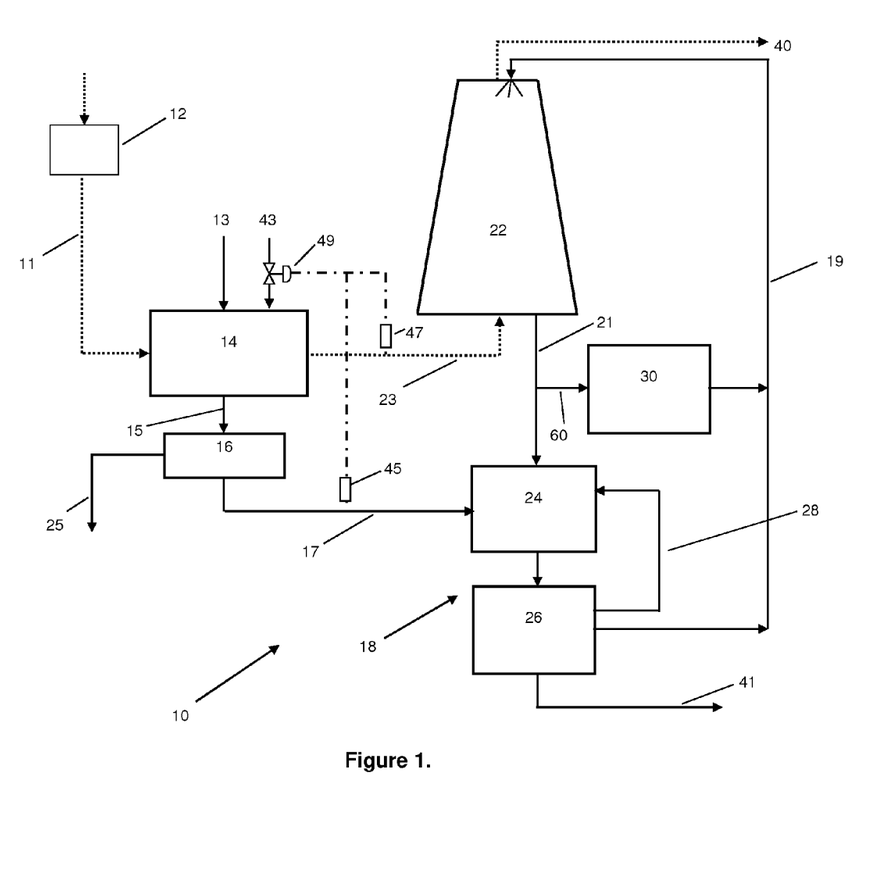
FIG. 1 is a block diagram showing the steps of a first embodiment of the subject method as carried out by a syngas conversion system run according to the method.

In the instant invention, in one suitable system 10, as shown in FIG. 1, a stream of hot syngas 11, after a preliminary step for removal of particulates in the syngas via a cyclone separator followed by additional removal in a bag house/filter or similar device at 12, is sent to a water based scrubber 14 where the ammonia gas in the syngas stream is captured to a high removal efficiency. This operation concurrently at least partially cools the syngas and results in considerable condensation of water vapor from the syngas into the scrubbing solution. The scrubbing solution 13 added to the scrubber 14 can be the purge water from fermentation and/or still bottoms that are acidic due to the acetic acid in the water, particularly, if the $CO_2$ level is insufficient to achieve the desired acidity. Acidity due to acetic acid keeps the pH in scrubber 14 low enough to achieve a high efficiency for ammonia removal. While temperature dependent equilibriums can affect optimal scrubber solution pH, the invention normally maintains the scrubbing solution at a pH of at least one pH unit less than and preferably closer to two pH units below the pH of ammonia which is 8.95. More specifically, for a scrubber water temperature of 35° C., the pH of the circulating scrubber water should be maintained at a pH of less than 7.5. For scrubber water temperatures of 55° C. and 75° C., the prefer pH would be, respectively, at least as low as 7.4 and 6.9, and preferably less than 6.9 and 6.4, respectively. Thus, the preferred pH of the circulating scrubber water should be maintained at a pH of less than 8.0, preferably less than 7.5. Adding the purge water from the fermentation process and/or still bottoms, which contains acetic acid, to the circulating scrubber water in the scrubber 14 readily can help provide the desired pH.

Aldehyde may be added via line 43 to react with or sequester HCN for its removal downstream in anoxic-aerobic biological treatment system 18. Aldehyde rate can be controlled through the use of at least one sensor that measures an indication of at least one chemical compound in either the syngas from the scrubber or scrubber water effluent stream. In a non-limiting example, sensor 45 measures an indication of aldehyde, glycol nitrile, and/or cyanide in scrubber liquid. Optionally, the limits required by the bioreactor 18 can be used to set desired limits on the indication. As commonly known in the industry, an electronic signal of the indication from the sensor 45 can be used to adjust a control valve 49 that controls the rate of addition of aldehyde via line 43. In another non-limiting example, sensor 47 measures an indication of aldehyde and/or cyanide in the syngas from the scrubber, which can similarly be used to adjust control valve 49 to control aldehyde injection rate.

The ammonia rich solution, also containing some dissolved HCN, can be sent to a separator 16 via line 15 for particulates removal, if desired or needed, or sent direct via a line 17 to a two stage anoxic-aerobic biological treatment system 18 having an anoxic treatment step 24 and an aerobic treatment step 26. If particulates are removed in a separator, they are discharged via line 25 for further processing. The effluent from the biological treatment system is then sent via a line 19 as the working fluid to a scrubbing tower 22 to remove additional HCN from the syngas. The effluent from the scrubbing tower 22 is removed via line 21 and recycled via a line 60 or processed in the same anoxic aerobic treatment system.

By using the proper amount of recycle flow from the biological treatment system effluent to the scrubbing tower 22, via line 19, high removal efficiency of HCN from the syngas is achieved and the sequential anoxic aerobic treatment steps result in high removal of the ammonium and the resultant nitrate produced from oxidation of the ammonium (via reduction in the anoxic stage of the biological process); removal of HCN is also at least partially achieved in the anoxic step which reduces any inhibition or toxicity this compound can cause on nitrification (biological ammonium oxidation) in the subsequent aerobic step.

Alkalinity is produced via the absorption and dissociation of the ammonia to ammonium in the water-based scrubber 14 water and additional alkalinity produced during reduction of the nitrate to $N_2$, using the acetate/acetic acid in the anoxic treatment step 18 is such that there is sufficient alkalinity present after the anoxic step to buffer the water during the ammonium oxidation or nitrification step. As a result little to no external source of alkalinity (such as caustic) is, required.

In this process, described in general terms above, the syngas is pretreated upstream of line 11 to remove the bulk of the particulates in a cyclone, bag house/filter or similar device. Sending the pretreated syngas stream to a water based scrubber 14 allows absorption of the ammonia and some HCN, depending on the water flow purge rate, temperature, and pressure the water scrubber is operated under.

The total liquid flow is sent via line 17 to the first step in the biological processing system 18, the anoxic reactor 24. Here it is blended with flow taken by line 21 from the scrubbing tower 22 (which contains nitrate formed in the aerobic/nitrification step along with HCN captured in the scrubber). The acetate/acetic acid added via the purge water is used as both the electron donor to reduce the nitrate to $N_2$ and the source of carbon for cell growth in the anoxic step. This eliminates the need and cost of adding an external source for providing these. HCN is at least partially concurrently degraded in the anoxic stage. This is important in that these compounds have the ability to inhibit the nitrification process if present at certain concentration levels. The reaction of nitrate reduction to nitrogen gas ($N_2$) produces approximately 3.57 mg alkalinity per mg of nitrate-N reduced. This the same as is produced by the absorption and dissociation of ammonia into water as ammonium (3.57 mg alkalinity per mg $NH_3$—N absorbed).The flow is then passed onto the aerobic step 26 where this alkalinity removed. Oxidation of any of any residual organics from the anoxic step also occurs in the aerobic reactor 26. A portion of the effluent from the aerobic reactor 26 has nitrate that is removed from the water as it is recycled via stream 19 through the scrubbing tower 22 and back to the anoxic step 24 in the process with another portion removed from the system 10 at 41.

By apportioning the liquid flow that is recycled back to the anoxic step from the aerobic step, either by routing through the scrubbing tower 22 via line 19 or directly back from the aerobic stage via line 28, the concentration of nitrate in the final effluent can be controlled. This allows the recycle rate to be decoupled from what is needed for scrubbing HCN at scrubbing tower 22 and, therefore, better process control of the final effluent quality. If extremely stringent nitrate discharge levels have to meet, a small polishing anoxic step (not shown) can be added prior to discharge.

A portion of the scrubbing tower effluent may be directed to a separate HCN removal system 30. System 30 can comprise any system for removal of HCN where HCN is either destroyed (via biological or chemical means), removed from aqueous solution (via adsorption with GAC (granular activated carbon)), or stripped from solution and managed elsewhere (such as the catalytic oxidizer, vapor phase GAC or other). Since the HCN is present as primarily a dissolved gas at pH of 8.0 or less, stripping, and using tail gas from the fermentation system which is ultimately thermally processed in a boiler, thermal oxidizer or similar device to treat or incinerate may be quite efficient and cost effective. Finally, the syngas processed by this method is sent to fermentation via a line 40.

Figure 2:
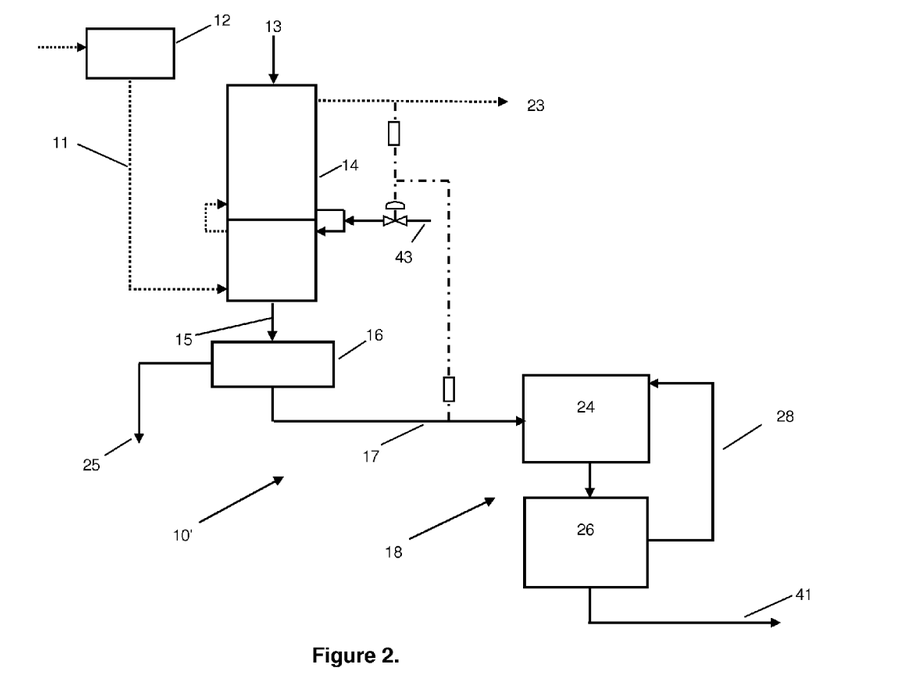
FIG. 2 is a block diagram showing the steps of a second embodiment of the subject method as carried out by a syngas conversion system run according to the method.

FIG. 2 shows a variation in the arrangement of this invention in a process arrangement 10' which is substantially identical to an upstream section of FIG. 1 and represents an arrangement of the invention that has been found to be efficient where extensive HCN removal is not required, a separate scrubbing tower 22 and HCN removal section 30 are not integrated into the process, or aldehyde is added to the scrubber water that reacts with or sequesters the HCN in a form or compound that is readily removed in the downstream particulate removal or anoxic-aerobic biological treatment steps. Like items in FIG. 1 are like numbered in FIG. 2. In the arrangement of FIG. 2, the cooled syngas 23 is sent directly to fermentation from the scrubber 14 or where necessary for the removal of hydrogen sulfide, benzene, toluene, and/or any other compounds in the syngas to additional separate scrubbers before being sent to fermentation. Where desired a line 43 can add aldehyde, either directly to the scrubber 14 or indirectly through addition to the circulating scrubber water that reacts with or sequesters HCN for its removal downstream in anoxic-aerobic biological treatment system 18. Optionally, the rate of aldehyde addition can be adjusted to help control cyanide and aldehyde entering the anoxic-aerobic biological treatment system. When scrubber solution is sent to separator 16 via line 15, particulates are removed via line 25 and the ammonia rich solution is then sent via a line 17 to a two stage anoxic-aerobic biological treatment system 18 having an anoxic treatment step 24 and an aerobic treatment step 26. The sequential anoxic-aerobic treatment steps result in high removal of the ammonium and the resultant nitrate produced from oxidation of the ammonium (via reduction in the anoxic stage of the biological process); at least partial removal of HCN is also achieved in the anoxic step which again eliminates inhibition or toxicity these compounds can cause on nitrification (biological ammonium oxidation) in the subsequent aerobic step. For embodiments that remove HCN by adding aldehydes to the scrubber, the resulting biodegradable glycol nitriles are removed in the sequential anoxic aerobic treatment steps.

As described previously alkalinity produced via the absorption and dissociation of the ammonia to ammonium in scrubber water of scrubber 14 water and additional alkalinity produced during reduction of the nitrate to $N_2$, using the acetate/acetic acid in the anoxic treatment step 18 is such that there is sufficient alkalinity present after the anoxic step to buffer the water during the ammonium oxidation or nitrification step. As a result little to no external source of alkalinity (such as caustic) is, required.

The process of FIG. 2 operates in the same manner where the syngas is pretreated upstream of line 11 to remove the bulk of the particulates in a cyclone followed by a bag house/filter or similar device and scrubber 14

The total liquid flow is sent to solids separator 16 via line 15 and then via line 17 to the first step in the biological processing system 18, the anoxic reactor 24 or if solids removal is not needed, total liquid flow is sent direct from scrubber 14 to biological treatment 18. HCN is at least partially concurrently degraded in the anoxic stage. In addition, when glycol nitriles are present in the scrubber liquid due to the addition of aldehyde to the scrubber to enhance removal of HCN, the glycol nitriles are also degraded in the anoxic stage.

The flow is again passed onto the aerobic step 26 where alkalinity is removed and oxidation of any of any residual organics from the anoxic step also occurs. The portion of the effluent from the aerobic reactor 26 has nitrate that is removed from the water as it is recycled back to the anoxic step 24 in the process with another portion removed from the system 10 at 41. When glycol nitriles are present in the scrubber liquid due to the addition of aldehyde to the scrubber 14 to remove HCN, residual glycol nitriles passed to aerobic stage are degraded.

Figure 3:
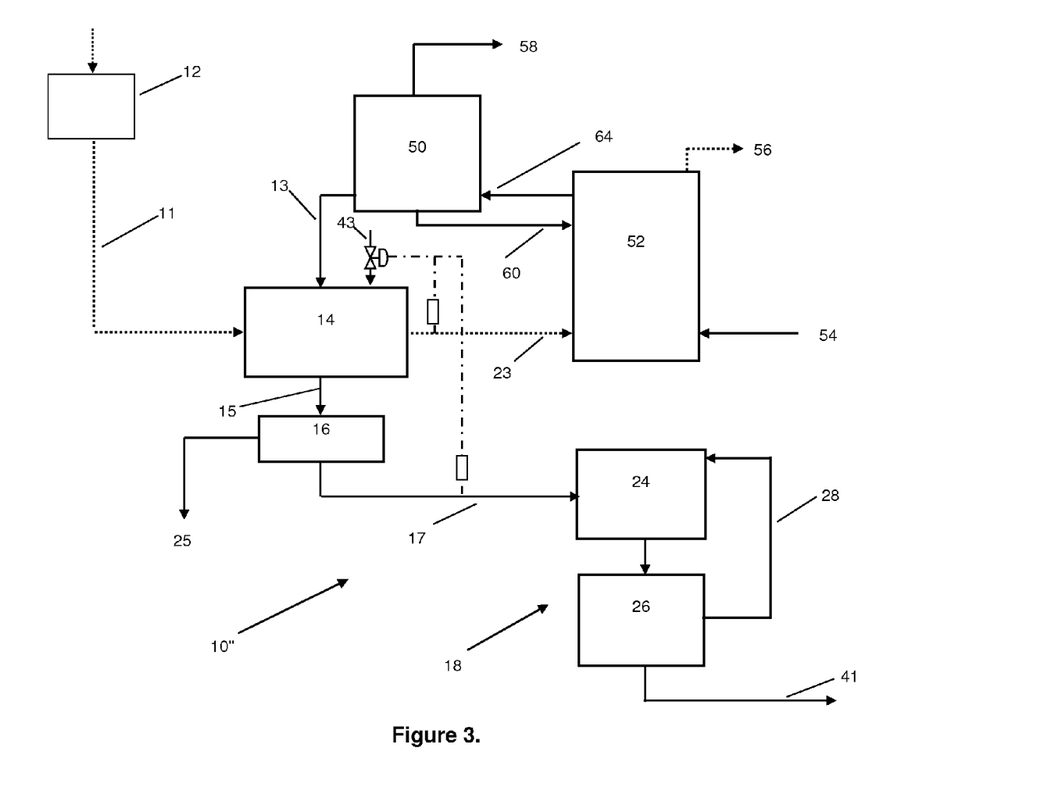
FIG. 3 is a block diagram showing the steps of a third embodiment of the subject method as carried out by a syngas conversion system run according to the method.

Finally, the syngas processed by this method is sent to fermentation via a line 40 and is more fully described in the description of FIG. 3.

In FIG. 3 the downstream processing of fermentation has been added to the disclosure of FIG. 2 in a process arrangement 10". Like items are again numbered alike. A distillation system or still 50 supplies purge water via a line 13 to the scrubber 14. Cleaned and cooled syngas taken by line 23 from the scrubber 14 is fed to a fermenter 52 for producing acetate and ethanol therefrom. Nutrient feed and process water are supplied thereto via line 54. Fermentation effluent from the fermenter 52 is fed to the distillation system 50 via line 64 and off gas from fermentation is removed therefrom via line 56. Ethanol from the distillation system 50 is removed for final processing via line 58 while the bottoms 60 therefrom are fed to the fermenter 52.

As described above the method of the present invention provides a number of advantages, some of which have been described above and others of which are inherent in the invention. Also modifications may be proposed without departing from the teachings herein. Accordingly the scope of the invention is only to be limited as necessitated by the accompanying claims.

The invention claimed is:

1. A method of treating a hot syngas stream for conversion to chemical products by removing various components from the hot syngas stream comprising the steps of:
   passing the hot syngas stream to a scrubber;
   adding aldehyde to a circulating scrubber water;
   capturing ammonia and HCN in the circulating scrubber water and condensing water from the hot syngas stream into the circulating scrubber water;
   withdrawing a scrubber waste water effluent from the scrubber comprising absorbed ammonia, ammonium, and absorbed HCN, and glycol nitriles, formed from the reaction of the aldehydes with HCN, from the scrubber;
      withdrawing a treated syngas stream effluent from the scrubber having a reduced concentration of ammonia and HCN; and,
      passing at least a portion of the scrubber waste water effluent stream to a biological treatment zone for the removal of ammonia, absorbed HCN, and glycol nitriles to produce a biologically treated waste water effluent.

2. The method of claim 1, wherein the aldehyde is selected from the group consisting of: formaldehyde, acetaldehyde, acrolein, and combinations thereof.

3. The method of claim 1, wherein the glycol nitrile comprises 2-hydroxyacetonitrile.

4. The method of claim 1, wherein an acid solution is added to the scrubber to control the pH.

5. The method of claim 4, wherein the acidic solution comprises purge water from a process for converting the treated hot syngas stream to chemical products and the addition of purge water is controlled to maintain the circulating scrubber water in a pH range of less than 8.0.

6. The method of claim 5, wherein the process for converting the treated hot syngas stream to chemical products is a fermentation process and the purge water comprises acetic acid and water.

7. The method of claim 1, wherein particulates in the scrubber water are passed through a separator to remove the particulates from the stream prior to biological treatment.

8. The method of claim 1, wherein at least a portion of the scrubber waste water effluent stream passes to an anoxic biological treatment step in the biological treatment zone for the partial conversion of nitrate formed from ammonia, and ammonium into nitrogen gas and for the at least partial conversion of HCN and glycol nitriles into primarily nitrogen and carbon dioxide to produce an anoxic effluent stream; at least a portion of the anoxic effluent stream passes to an aerobic biological treatment step in the biological treatment zone for the nitrification of ammonium to nitrates, and for the at least partial conversion of glycol nitrile into primarily nitrogen and carbon dioxide; the biologically treated waste water stream is recovered from the aerobic biological treatment step; and a portion of the biologically treated waste water stream is recycled back to the anoxic biological treatment step.

9. The method of claim 1, further comprising measuring at least one indicator of an amount of cyanide or aldehyde remaining in the scrubber gas and adjusting a rate of aldehyde addition to the scrubber circulating water in response to maintain the level of HCN in the syngas below the desired concentration required in the application it is to be used for.

10. The method of claim 1, further comprising measuring at least one indicator of an amount of aldehyde, glycol nitrile, or cyanide contributed by the scrubber waste water effluent stream passed to the anoxic biological treatment step, and adjusting a rate of aldehyde addition to the scrubber circulating water in response to the indicated contribution of aldehyde to the anoxic biological treatment step from the aldehyde containing scrubber waste water effluent.

11. The method of claim 8, wherein the amount of biologically treated waste water recycled from the aerobic biological treatment step to the anoxic biological treatment step is adjusted to maintain a predetermined effluent nitrate concentration and the anoxic biological treatment step is maintained at a pH range of from 6.0 to 9.0.

12. The method of claim 6, wherein the purge water comprises acetic acid that provides sufficient carbon for cellular growth of microorganisms and for the reduction of nitrate to $N_2$ in the anoxic biological treatment step.

13. The method of claim 1, wherein at least a portion of the treated syngas stream effluent passes to an additional aldehyde scrubbing stage or additional scrubbing tower to remove aldehyde from the syngas.

14. The method of claim 13, wherein at least a portion of the biologically treated waste water effluent stream passes to the additional aldehyde/HCN scrubbing stage(s) or scrubber for contact with the cleaned syngas.

15. A method of treating a hot syngas stream for conversion to chemical products by removing ammonia and HCN from the hot syngas stream comprising the steps of:
   passing the hot syngas stream to a scrubber;
   adding an acidic solution comprising acetic acid, aldehyde, and water to a circulating scrubber water and maintaining the pH of the scrubber water at a pH of less than 8.0;
   capturing ammonia and HCN in the circulating scrubber water and condensing water from the hot syngas stream into the circulating scrubber water;
   withdrawing a scrubber waste water effluent from the scrubber comprising absorbed ammonia, ammonium, and absorbed HCN, and glycol nitriles, formed from the reaction of the aldehydes with HCN, from the scrubber;
   withdrawing a treated syngas stream effluent from the scrubber comprising having a reduced concentration of HCN and ammonia;
   passing at least a portion of the scrubber waste water effluent stream to a biological treatment zone for the removal of ammonia, absorbed HCN, and glycol nitriles to produce a biologically treated waste water effluent.

16. The method of claim 15, further comprising measuring at least one indicator of an amount of cyanide or aldehyde remaining in the scrubber gas and adjusting a rate of aldehyde addition to the scrubber circulating water in response to maintain the level of HCN in the syngas below the desired concentration required in the application it is to be used for.

17. The method of claim 15, further comprising measuring at least one indicator of an amount of aldehyde, glycol nitrile, or cyanide contributed by the scrubber waste water effluent stream passed to the anoxic biological treatment step, and adjusting a rate of aldehyde addition to the scrubber circulating water in response to the indicated contribution of aldehyde to the anoxic biological treatment step from the aldehyde containing scrubber waste water effluent.

18. The method of claim 15, wherein at least a portion of the scrubber waste water effluent stream passes to an anoxic biological treatment step in the biological treatment zone for the partial conversion of nitrate formed from ammonia, and ammonium into nitrogen gas, and for the at least partial conversion of HCN and glycol nitriles into primarily nitrogen and carbon dioxide to produce an anoxic effluent stream; at least a portion of the anoxic effluent stream passes to an aerobic biological treatment step in the biological treatment zone for the nitrification of ammonium to nitrates, and for the at least partial conversion of glycol nitriles into primarily nitrogen and carbon dioxide; the biologically treated waste water stream is recovered from the aerobic biological treatment step; and a portion of the biologically treated waste water stream is recycled back to the anoxic biological treatment step.

19. The method of claim 15, wherein the acidic solution comprises purge water from a process for converting the treated hot syngas stream to chemical products and the addition of purge water is controlled to maintain the circulating scrubber water in a pH range of less than 8.0.

20. The method of claim 19, wherein the process for converting the treated hot syngas stream to chemical products is a fermentation process and the purge water comprises acetic acid and water.

\* \* \* \* \*